United States Patent [19]
Tanner

[11] 4,043,194
[45] Aug. 23, 1977

[54] WIND SHEAR WARNING SYSTEM

[76] Inventor: Jesse H. Tanner, 3434 S. 144th, Seattle, Wash. 98168

[21] Appl. No.: 716,190

[22] Filed: Aug. 20, 1976

[51] Int. Cl.[2] .............................................. G01C 21/00
[52] U.S. Cl. .............................. 73/178 T; 235/150.22
[58] Field of Search ............ 73/178 T, 178 R, 170 R, 73/189; 235/150.22; 340/27 NA

[56] References Cited

U.S. PATENT DOCUMENTS

| | | | |
|---|---|---|---|
| 3,285,067 | 11/1966 | Greene | 73/178 T |
| 3,327,972 | 6/1967 | Greene | 73/178 T |

*Primary Examiner*—Charles A. Ruehl
*Attorney, Agent, or Firm*—Herbert E. Farmer; Harold P. Deeley, Jr.; Otto M. Wildensteiner

[57] ABSTRACT

Wind conditions along the projected flight path of an aircraft are measured and displayed. Wind velocity and direction at the aircraft and at the projected touchdown or takeoff point of the aircraft are compared and the existence of a wind gradient or wind shear line along the flight path is predicted. The possible presence of a wind shear line and the velocity differential there across is used, in cooperation with altitude and airspeed information and the performance characteristics of the aircraft, to determine whether the planned maneuver may be successfully completed under the instantaneously existing wind conditions.

12 Claims, 3 Drawing Figures

WIND SHEAR WARNING SYSTEM

ORIGIN OF THE INVENTION

The invention described herein was made by an employee of the United States Government and may be manufactured and used by or for the Government for governmental purposes without payment of any royalties thereon or therefor.

BACKGROUND OF THE INVENTION

1. Field of the Invention

The present invention relates to enhancing the safety of operation of aircraft and particularly to providing an aircraft crew with real-time information pertaining to wind conditions along an approach to and taking off from a runway. More specifically, this invention is directed to apparatus for detecting and providing an indication of wind gradient-wind shear conditions. Accordingly, the general objects of the present invention are to provide novel and improved methods and apparatus of such character.

2. Description of the Prior Art

The effects of wind gradients, and particularly passage through a wind shear zone, on aircraft have long been known. Recently, because of accidents attributed to wind shear, substantial attention has been devoted to developing the capability of warning aircraft crewmen of the existence of a shear line along the aircraft flight path. Much of this attention has been directed toward the utilization of known sensing devices, such as Doppler radar and acoustic radar, in wind shear warning systems. While radar technology appears ultimately to offer considerable promise, implementation of a wind shear warning system employing radar techniques will of necessity provide an expensive solution to the problem of providing the requisite warning. Further, the radar techniques presently under consideration for providing warning of the existence of wind shear zones lack the capability of providing the aircraft crew with real-time information concerning conditions along the aircraft flight path. Obviously, the aircraft operator needs information which informs him of the exact nature of the current wind conditions and further warns him when the wind conditions are such that extraordinary corrective measures are needed. Additionally, and most importantly, a wind shear warning system should provide the pilot with a "last chance" warning indicating that the instantaneous conditions are such that the maneuver being executed, for example a landing approach, should be terminated.

To further discuss wind shear warning systems in general, and it is to be noted that there is at present no apparatus available suitable for providing useful real-time information with respect to wind gradients or wind shear along an approach path to or departure path from a runway, such systems should preferably be possessed of a number of features and capabilities. Thus, a wind shear warning system must be able to detect a wind gradient, and particularly a discrete wind shear, on an approach path to a runway prior to the aircraft making a final approach to the runway. Similarly the system must be capable of measuring the magnitude of any detected wind gradient or shear along the approach path to the runway and providing information to the aircraft crew commensurate therewith prior to and at all points along the approach path. The warning system must also possess the capability of determining, prior to the approach, whether any existing wind gradient the aircraft will encounter is a decreasing headwind or tailwind or an increasing headwind or tailwind. Further, the system should provide the aircraft crew with information as to whether any shear zone detected has been traversed by the aircraft or still exists along the projected approach path of the aircraft. Also, prior to the aircraft's approach, the system must have the capability of determining and indicating whether a detected wind shear is a headwind/tailwind shear or a tailwind-/headwind shear. The wind shear warning system should also include apparatus which will determine, taking into account the flight characteristics of the aircraft and the measured wind conditions which will be encountered, the "worst case" airspeed change which may be expected. Accordingly, the warning system should have the capability of calculating expected airspeed changes and continually updating the calculation in accordance with changes in the measured wind gradient or shear velocity differential and sensed actual aircraft speed. Some or all of the measured and calculated information should, of course, be displayed to the aircraft crew. Further, if the planned flight path of the aircraft calls for it to traverse a headwind/tailwind shear line, the system should compute the minimum altitude to which the aircraft may descend prior to passing the shear line and generate a readily perceivable abort warning signal should the approach path call for the aircraft to pass through the computed altitude prior to reaching the shear line. In the case of a tailwind-/headwind shear line, the system must compute the airspeed which will exist after the shear is traversed and compare it to a preset maximum; an abort or go-around warning being automatically given if such preset maximum airspeed is exceeded at the flare altitude.

Further, the warning system should have the capability of detecting wind gradient-wind shear conditions which affect an aircraft's takeoff performance. These conditions are decreasing headwind gradients, increasing tailwind gradients, and headwind/tailwind shear zones encountered along the takeoff flight path. If the magnitude of the gradient or shear exceeds a precomputed level at a given altitude, taking into account the flight characteristics of the aircraft, the warning system should generate a "takeoff shear" warning to alert the flight crew that immediate action is necessary to maintain a safe airspeed.

SUMMARY OF THE INVENTION

The present invention accomplishes the above-stated desirable objectives and, in so doing, provides a novel system for measuring and displaying wind conditions along an aircraft flight path and particularly wind gradients and wind shears. Thus, in accordance with the invention, the wind velocity and direction at the projected touchdown or takeoff point of an aircraft, the altitude of the aircraft, the airspeed and the ground speed of the aircraft are sensed or calculated and these sensed or calculated parameters are employed to predict the existence of wind gradients and wind shear lines and the magnitude thereof. Additionally, the performance characteristics of the aircraft are stored, in the memory of a microprocessor, and the calculated wind conditions are matched with the aircraft performance characteristics to determine whether an unsafe flight regimen may be approached for the existing conditions.

BRIEF DESCRIPTION OF THE DRAWING

The present invention may be better understood and its numerous objects and advantages will become apparent to those skilled in the art by reference to the accompanying drawing wherein.

DESCRIPTION OF THE PREFERRED EMBODIMENT

Figure 1:
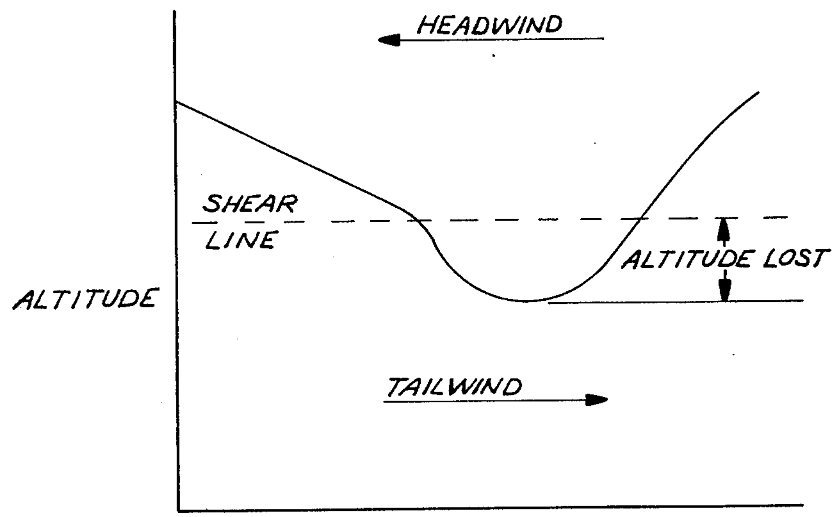
FIG. 1 is a graphical representation of the problem to which the present invention is directed.
Figure 2:
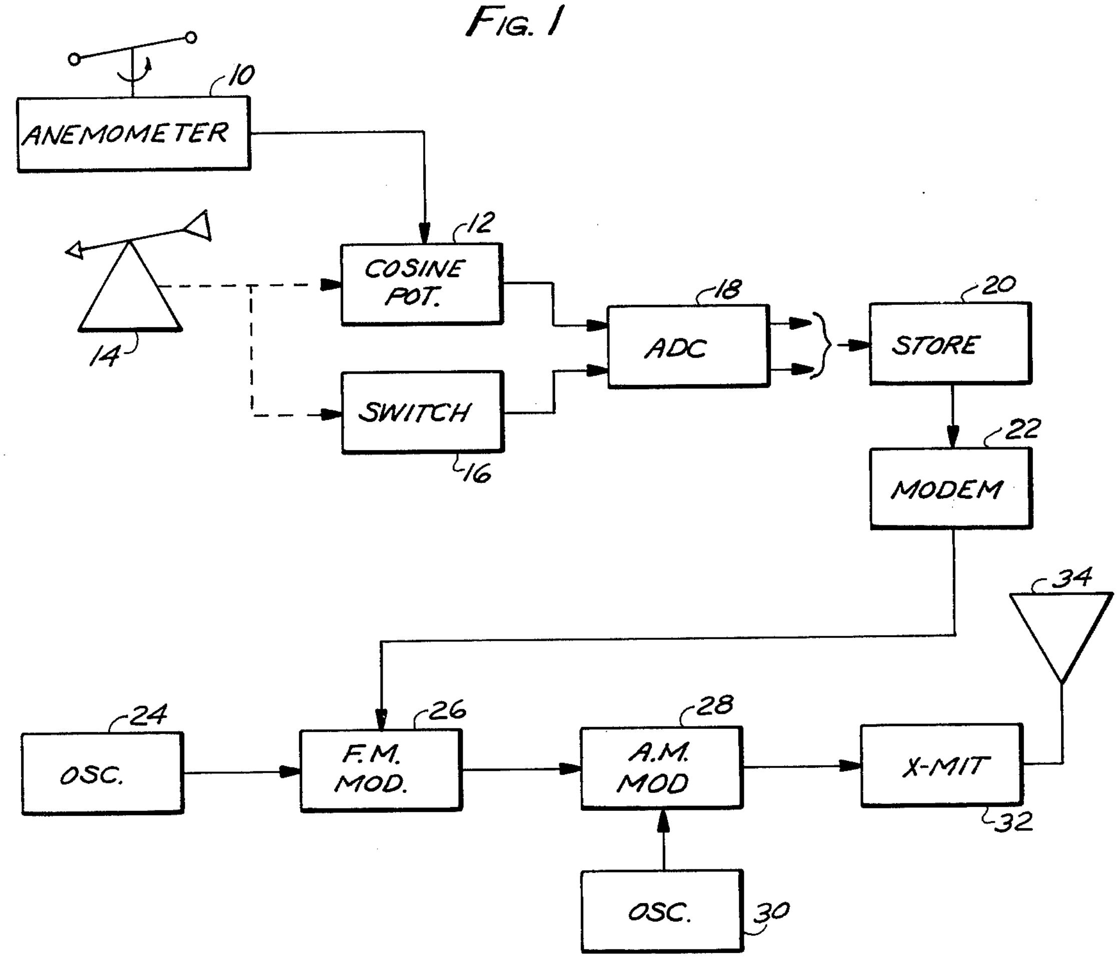
FIG. 2 is a block diagram of the ground installation portion of a preferred embodiment of a wind gradient-wind shear warning system in accordance with the present invention.
Figure 3:
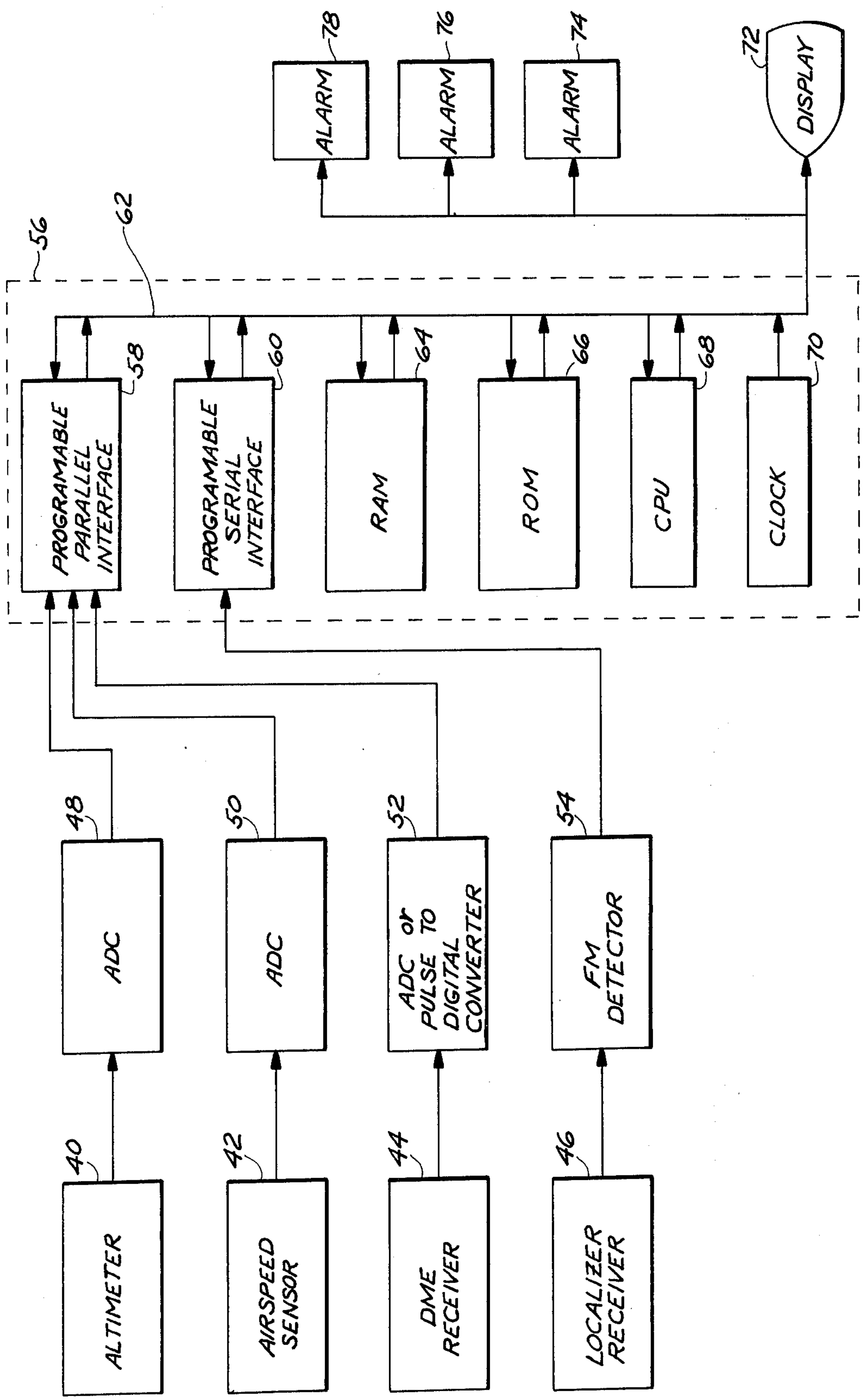
FIG. 3 is a block diagram of a preferred embodiment of the airborne portion of a wind shear-wind gradient warning system in accordance with the present invention.

Before describing the preferred embodiment as depicted in FIGS. 2 and 3, a brief explanation of the problem to which the present invention is directed will be set forth by reference to FIG. 1. There are, of course, a number of wind gradient conditions which may be encountered by an aircraft during the most critical phases of flight; i.e., the approach to landing phase and the takeoff phase. First, by way of example, the aircraft on approach may encounter a decreasing headwind, without a shear line, which will result in a loss of airspeed and an increased sink rate which requires trim and power setting corrections. The information required to enable the pilot to make such trim and power setting corrections is the magnitude of the decreasing headwind gradient between the aircraft's position on the approach and the intended runway threshold and, of course, the knowledge that no shear line exists. The aircraft may, as it descends along the approach path, encounter an increasing headwind which will produce an increase in airspeed and a decreased sink rate. This condition also requires the pilot to make trim and power setting corrections. The information necessary to enable the appropriate corrections is the magnitude of the increase in headwind gradient and, again, the knowledge that no shear line exists. Although not the usual condition, the aircraft may also encounter decreasing tailwinds in its descent. A decreasing tailwind will produce an airspeed gain and a decreased sink rate which requires the pilot to effect trim and power setting corrections. The information required in order to enable such corrections to be made is the magnitude of the decreasing tailwind gradient between the aircraft's position on the approach and the intended runway threshold and the knowledge that no shear line exists. Should the aircraft experience increasing tailwinds along its approach path, airspeed will decrease and sink rate will increase. The requisite trim and power corrections can be made by the pilot if he is provided with information concerning the magnitude of the increasing tailwind gradient between the aircraft position on the approach and the intended runway threshold and if the pilot is assured that no shear line exists.

Referring to FIG. 1, should there be a headwind-tailwind shear, as the aircraft descends through the shear line there will be an abrupt loss of airspeed proportional to the magnitude of the headwind-tailwind velocity differential. The aircraft sink rate will be increased proportional to this loss of airspeed. Obviously, if the shear line is crossed at low altitude close to touchdown, recovery from the sudden increase in sink rate may be beyond the performance capability of the aircraft and the aircraft may contact the ground short of the runway. To insure that this will not occur the pilot must be provided with the knowledge that a shear line exists and the magnitude of the headwind-tailwind velocity differential must be measured. For each specific measured velocity differential, a minimum descent altitude from which recovery could be made must be calculated. This calculation, in order to be performed, requires that the descent and climb-out profile of the particular aircraft, when subjected to a virtually instantaneous loss of airspeed such as experienced in a headwind-tailwind sheet line traversal, be known. In FIG. 1 the aircraft descent-climbout profile is represented by the departure from the linear approach path which occurs after the shear line traversal.

Continuing to refer to FIG. 1, and reversing the wind directions, if the aircraft descends through a tailwind-headwind shear there will be an abrupt increase in airspeed proportional to the magnitude of the tailwind-headwind velocity differential. Thus, upon traversal of a tailwind-headwind shear line, sink rate will suddenly decrease proportionally to the increase in airspeed. Obviously, if the shear line is crossed near touchdown, a long landing and reduced usable runway could result. In order to preclude the possibility of touchdown at a point where insufficient runway remains to safely bring the aircraft to a halt, the pilot must be provided with knowledge that a shear line exists and the magnitude of the tailwind-headwind velocity differential must be measured. Again taking into account the characteristics of the particular aircraft, the maximum velocity differential which would permit a safe landing for the type of aircraft being flown must be calculated. This calculation will consist of a comparison of the anticipated airspeed at touchdown with the maximum airspeed permitted over the touchdown zone at a preselected altitude; such preselected altitude typically being fifty feet.

Also by way of example, an aircraft taking off may encounter decreasing headwinds, increasing tailwinds, or headwind/tailwind shear zones which adversely affect the takeoff performance of the aircraft by decreasing airspeed. Thus, the system should be capable of measuring the actual magnitude of the gradient or shear velocity differential since lift-off and of indicating to the flight crew of a departing aircraft that an adverse wind shear or gradient is being encountered. By using only those computed values of wind gradient or wind shear which correspond to decreasing airspeed, an alarm may be triggered only for these hazardous conditions while measured gradient or shear conditions which improve takeoff performance; i.e., decreasing tailwind, increasing headwind, and tailwind/headwind shear; will not result in a warning being generated.

Thus, to summarize the information requirements for approach, a usable wind shear warning system must measure or compute the magnitude of headwind or tailwind gradients and whether or not a shear line exists. If a shear line does exist, the warning system must be able to determine whether it is a headwind-tailwind shear or a tailwind-headwind shear and the magnitude of the shear velocity differential. The warning system must also be provided with information concerning the performance characteristics of each aircraft on which the system is installed so as to enable determination of the minimum descent altitudes for safe recovery from undershoot or safe landing parameters for overshoot situations. For takeoffs, the magnitude of adverse wind gradient-wind shear comditions must be computed and displayed and, if precomputed potentially hazardous levels of gradient or shear exist at given altitudes, the warning system must be capable of timely warning of such conditions.

With reference now to FIG. 2, which schematically represents the ground installed components of a warning system in accordance with a preferred embodiment of the invention, the wind speed at the runway threshold will be measured in the conventional manner through the use of an anemometer as indicated at 10. Since crosswind data is not essential to the proper operation of the invention, for purposes of explanation it will be presumed that only the runway in-line wind components will be measured. Anemometer 10 will be a state-of-the-art device including a DC voltage generator which provides an output voltage having an amplitude commensurate with wind velocity. Anemometer 10 may also include a calibrated DC amplifier which provides a buffered output signal commensurate with wind speed in calibrated voltage increments per knot.

The DC output voltage from anemometer 10 is applied as the electrical input to a cosine potentiometer 12. A vane type wind direction detector 14 is connected, either directly mechanically or via a synchro system, to the wiper arm shaft of cosine potentiometer 12. The resistance of potentiometer 12 will thus be varied in accordance with the cosine of the angular displacement from the runway bearing of the wind direction. Restated, potentiometer 12 is a circular potentiometer with its reference point corresponding to the runway bearing whereby the voltage at the wiper arm of the potentiometer will, in the conventional manner, be commensurate with the velocity component of the wind which is in line with the runway bearing.

The output of wind direction detector 14 is also coupled to a two-segment circular switch 16. Switch 16 is oriented such that one segment is closed when the wind direction is from the runway heading $\pm$ 90° and the other segment is closed when the wind direction is from the reciprocal runway bearing $\pm$ 90°. Switch 16 will be coupled to a suitable bias voltage source, not shown, such that it will provide an output signal indicative of whether the prevailing wind includes a component along or reciprocal to the runway bearing.

The in-line wind velocity signal from potentiometer 12 and the direction indication from switch 16 are applied to an analog-to-digital converter 18. The converter 18 may, for example, be an 8-bit device which provides 7-bit data words representing wind velocity in increments of, for example, one knot. The eighth bit of data appearing at the output of converter 18 will indicate whether the wind is a headwind or a tailwind. Information is transferred out of converter 18 in parallel fashion.

Continuing with a discussion of the example wherein converter 18 provides 8-bit output words, these 8-bit words are delivered to a parallel in, serial out shift register indicated as a storage device 20. Storage register 20 may include a synchronizing clock whereby the information delivered from the register to a modulator-data-line-demodulator 22 will be updated as often as required, and permit synchronous data transmission. Storage device 20 and modem 22 are state-of-the-art components and will not be described further herein.

The output of modem 22 will comprise serial binary digits which are employed, in the known manner, to frequency modulate a sub-carrier signal of an ILS localizer transitter. Alternately, a separate transmitter could be employed. In the embodiment shown, the localizer transmitter output signal is modulated. Thus, again by way of example, a 9960 Hz sub-carrier, as provided by oscillator 24, is frequency modulated in modulator 26 by the output of modem 22. A 480 Hz deviation has been found to be sufficient and is compatible with existing VOR-localizer receivers employed on aircraft. The frequency modulated subcarrier is applied to the localizer amplitude modulator 28 input wherein it modulates the output of oscillator 30 and thereby amplitude modulating the localizer transmitter 32. The thus modulated ILS localizer signal is transmitted, from antenna 34, to the aircraft.

It will be understood that there are numerous available techniques and apparatus which may be employed to sense the wind velocity and direction at the runway threshold and to transmit this information to the wind gradient-wind shear microprocessor. Thus, by way of example, the wind direction and total velocity could be transmitted and the headwind-tailwind in-line components derived at the airborne microprocessor. Also, rather than employ a two-position switch, wind direction may be digitized using a code disc driven by the wind direction vane. Numerous other alternatives will be obvious to those skilled in the art and will not be discussed herein.

Referring to FIG. 3, and again bearing in mind that only a single embodiment of the invention has been disclosed, the airborne components of the wind gradient-wind shear warning system are depicted. The disclosed embodiment of the invention utilizes output signals provided by equipment carried by all commercial aircraft. Thus, inputs to the apparatus of FIG. 3 are generated by the aircraft's altimeter 40, airspeed sensor 42, DME receiver 44 and localizer receiver 46. As depicted in FIG. 3, altimeter 40 provides an analog output signal which is converted to digital form in an analog-to-digital converter 48. It is standard practice in the art to convert the output of barometric type altimeters to digital form through the use of code discs and light source-sensing devices. Radar altimeters are available which provide output information in either digital, pulse or analog form. Pulsed radar altimeter outputs can be converted to digital form by using digital counting circuits and analog outputs from radar altimeters may be converted by analog-to-digital converters. The present invention should preferably, but not necessarily, utilize a separate encoding altimeter since information regarding only a comparatively small range of lower altitudes; i.e., 1500′ AGL and below; is necessary for operation. The use of a separate altimeter permits finer incremental changes in altitude to be sensed and information commensurate therewith to be available for computation purposes.

The airspeed sensor 42 will be a pressure actuated device, similar in design to the barometric altimeter. The output of the airspeed sensor is digitized by analog-to-digital converter 50 to facilitate further processing of the airspeed information, using the same techniques previously described for the altimeter.

The DME (distance measuring equipment) receiver 44 will provide an output signal commensurate with ground speed. The DME receivers customarily installed in light general aviation aircraft will typically provide an analog output voltage; the amplitude of such voltage being commensurate with the ground speed of the aircraft. Such voltage may be digitized using a state-of-the-art analog-to-digital converter 52. DME systems as employed on air carrier aircraft generate a ground speed output signal in the form of voltage pulses; a pulse being generated each time the range changes by 0.01 miles. The ground speed of the aircraft is thus proportional to the range rate. These output pulses may be digitized using state-of-the-art pulse-to-digital converter which has also been represented at 52. It will be understood that, in lieu of DME receiver 44, the present invention may employ an inertial navigation system or Doppler radar system in order to provide ground speed information.

The sub-carrier modulated by the runway threshold wind direction and velocity information in modulator 26 of FIG. 2 is amplitude detected by the localizer—-VOR receiver 46 and applied to the VOR reference signal portion of the receiver, as indicated at 54, which detects the frequency modulated sub-carrier and provides a serial digital output commensurate therewith.

The digitally coded signals commensurate with altitude, as provided by converter 48, airspeed, as provided by converter 50, ground speed, as provided by converter 52, and wind velocity and direction at the runway threshold, as provided by FM detector 54, are delivered as inputs to on-board computer 56.

Computer 56 will take the form of a microprocessor having a programmable parallel interface 58, a programmable serial interface 60, a random access memory 64, a read only memory 66, a central processing unit 68, and a system clock 70. Altitude, airspeed and ground speed input information is loaded into random access memory 64 in parallel form thru programmable parallel interface 58. Runway wind information is loaded into random access memory 64 in serial form thru programmable serial interface 60. The read only memory 66 will contain the program instructions which cause the central processing unit 68 to perform the logical and arithmetic functions necessary to the performance of the invention. Memory 66 also contains the control instructions which enable the computer 56 to function as an integrated unit. The various elements are controlled by functional commands, memory addresses, and data inputs which are exchanged between the computer elements under the control of the central processing unit 68 as it executes the program instructions contained in read only memory 66. This is accomplished thru system busses 62 at a rate determined by the system clock 70.

Information concerning the performance data for the aircraft will also be stored in read only memory 66. This information is stored in tabular form and, as will be discussed in greater detail below, will consist of the aircraft descent and climb-out profile when the aircraft is subjected to incremental values of wind gradient or shear. The manner of derivation of these data will also be discussed in greater detail below. The microprocessor 56 will determine the presence of a headwind or tailwind at the aircraft's by subtracting ground speed from airspeed. If the result is algebraically minus, the aircraft is encountering a tailwind, the magnitude of which is equal to the absolute difference between airspeed and ground speed. If the result is algebraically plus, the aircraft is encountering a headwind, the magnitude of which is equal to the difference between airspeed and ground speed.

For approaches the microprocessor 56 will further determine, by direct comparison of such aircraft headwind or tailwind with the runway threshold wind data, which is identified by the microprocessor as an algebraic plus value for a threshold headwind and as an algebraic minus value for a threshold tailwind using the eighth data bit as previously described, and which is resident in random access memory 64, whether a wind gradient or wind shear exists between the aircraft's position on the approach and the runway threshold. If the algebraic signs are the same, no discrete wind shear line exists, conversely, if they are different a discrete shear line exists. If a shear line exists, microprocessor 56 will compute the magnitude thereof by taking the absolute value of the difference between the aircraft headwind/tailwind magnitude and the runway threshold tailwind/headwind magnitude. Using the algebraic signs of the respective data as previously described, microprocessor 56 will identify such shear line as a headwind/tailwind shear or a tailwind/headwind shear. Further, if no shear line exists, microprocessor 56 will, by comparing the magnitude of the aircraft's headwind-/tailwind to the magnitude of the runway threshold headwind/tailwind, determine if a wind gradient exists and compute its value by taking the absolute value of the difference between the two magnitudes and, using the algebraic signs of the data, determine if it is a headwind gradient or a tailwind gradient. By determining whether the aircraft headwind/tailwind magnitude or the runway threshold headwind/tailwind magnitude is greater, microprocessor 56 will identify the gradient as a decreasing headwind, increasing headwind, decreasing tailwind, or increasing tailwind.

For takeoffs, the microprocessor 56 determines the magnitude of wind gradients or wind shear lines as described for approaches without regard to identifying the type of gradient or shear line. Microprocessor 56 further compares successive airspeed inputs and when the most recent airspeed input is less than the previous input, it identifies the gradient or shear magnitude as takeoff shear since all gradient or shear conditions which adversely affect takeoff performance result in decreasing airspeed.

Some or all of the information computed in microprocessor 56 is displayed to the aircraft crew by a display device 72. Display 72 may, for example, employ light emitting diodes arranged in a matrix; the diodes being associated with decoding and driver circuits. The display will provide the pilot making an approach with information concerning the nature; i.e., headwind or tailwind; of the wind velocity component at the runway threshold and its magnitude. The display should additionally indicate whether the aircraft is experiencing a headwind or tailwind and its magnitude. The display should further prominently inform the aircraft crew whether or not a wind shear condition exists along the flight path and, if there is a shear line, the magnitude of the velocity differential should also preferably be displayed. It is considered desirable to display the computed airspeed which the aircraft is predicted to have at the runway threshold. This computed airspeed can be compared with the actual airspeed and, if an abrupt change in airspeed appears to be imminent, the pilot can take appropriate action without waiting for a "last chance" warning. It is within the capability of the art for the display to also be arranged so as to permit the aircraft crew to request the presentation of other data such as, for example, the calculated minimum safe descent altitude. For takeoffs the display device 72 will inform the pilot of the magnitude of shear being encountered which is identified as takeoff shear. Displays of the type generally discussed above are commercially available and will operate under the control of the central processor 68 of microprocessor 56.

The wind shear warning system of the present invention is also provided with visual and/or aural warning devices. Although a single warning device can be employed, in FIG. 3 three warning devices, 74, 76 and 78 are shown. These warning devices may consist simply of noise generators and appropriate drivers which are activated under control of microprocessor 56. The warnings to be sounded are commensurate with (1) a prediction that the minimum safe descent altitude for the given calculated discrete wind shear velocity differential will be violated and (2) that the maximum airspeed permitted over the touchdown zone will be exceeded and (3) that the aircraft is encountering takeoff shear.

As previously noted, and as depicted by FIG. 1, the aircraft performance data stored in memory 66 is, in effect, a description of the descent and climb-out profiles of the aircraft for various flight conditions. For the headwind-tailwind shear condition, there will be a unique altitude loss for each shear velocity differential-/airspeed combination for each particular type of aircraft. Should the predicted altitude loss exceed the actual instantaneous altitude of the aircraft plus a safety margin prior to traversal of the shear line, a warning signal must be generated and this signal must be immediately perceived by the pilot. It should be noted that the instantaneous airspeed changes corresponding to the losses in altitude may be generated in flight simulators which emulate actual aircraft performance characteristics. Accordingly, existing flight simulators may be employed to derive minimum safe descent altitude warnings by programming wind shear conditions into the simulators. Restated, the descent and climb-out family of profile curves are developed with an altitude loss associated with each magnitude of wind shear line velocity differential. The developed data is placed in read only memory 66 and the warning device 74 will be energized in response to a simple look-up procedure and comparison of tabulated values of altitude loss for wind shear line velocity differentials with the actual measured velocity differential and altitude. During the landing approach, if actual altitude is greater than table altitude loss values, the data are discarded and the process is repeated in accordance with the cycle time of the microprocessor 56 or, if desired, in accordance with a preselected timing pattern wherein the interval is greater than the microprocessor cycle time. Any time the actual altitude is equal to or less than the table altitude, the alarm 74 will be energized.

The need for energization of the second type of warning; i.e., the maximum airspeed permitted over the touchdown zone as provided by device 76; will be similarly derived using flight simulators and incremental increases in tailwind-headwind velocity differential. The dispersion of touchdown distances from flare altitude, as a result of shear line velocity differential causing an increase in airspeed, can be simulated and a maximum airspeed limit at flare altitude developed. The maximum airspeed limit for the tailwind-headwind shear velocity differentials will be stored in read only memory 66 and warning device 76 will be energized if measured airspeed at flare altitude exceeds the maximum value as stored in the memory. It is to be noted that, if warning 76 is energized, the landing should be aborted and a go-around maneuver immediately executed since, if the pilot attempts to bleed off airspeed and then discovers he must go-around, the aircraft will be in a reduced airspeed climb-out configuration and will be required to traverse the same shear line. This shear line, when traversed in the low-to-high altitude direction, becomes a headwind-tailwind shear line. Obviously, this would further reduce airspeed and could cause a hazardous condition.

The need for energization of the third type of warning; i.e., the takeoff shear warning as provided by device 78; will be similarly derived using aircraft flight simulators with the aircraft in takeoff configuration and incremental increases in wind gradient and shear conditions which adversely affect takeoff performance. The lower altitudes, immediately after takeoff, are more critical with respect to the level of gradient or shear which can be tolerated. Thus, the level of tolerable gradient or shear increases as a function of altitude after lift-off. By associating each such value of gradient or shear with the appropriate altitude in a tabular format in read only memory 66, the takeoff gradient or shear warnings are reduced to a simple computer table lookup. At a given altitude, if the measured gradient or shear levels equal or exceed the tabular values, the alarm 78 is triggered. Since the actual measured gradient or shear is being continuously computed, it may be displayed irrespective of whether the alarm level is exceeded or not. These values are displayed as "takeoff shear". Further identification is not necessary since the pilot is committed and the required action in any case is increased thrust and aircraft trim adjustments to maintain airspeed while climbing out.

While a preferred embodiment has been shown and described, various modifications and substitutions may be made thereto without departing from the spirit and scope of the invention. Thus, by way of example, the microprocessor could be eliminated and hard-wired logic circuits substituted therefor. Further, if all inputs were converted to analog form using state-of-the-art converters, analog circuitry consisting of, for example, inverters, summing amplifiers, switches, and metering circuits could provide the information previously described herein with the exception of the microprocessor generated warning signals. Accordingly, it will be understood that the present invention has been described by way of illustration and not limitation.

What is claimed is:

1. A method of determining wind conditions along the projected flight path of an aircraft comprising the steps of:

- measuring the in-line wind velocity and determining its direction at the threshold of a runway;
- measuring the in-line wind velocity and determining its direction at the aircraft;
- comparing the measured in-line wind directions to determine if a wind shear zone as indicated by oppositely moving wind currents will be crossed if the aircraft continues on the projected flight path;
- calculating the velocity differential between the oppositely moving wind currents when a shear zone is determined to be present along the aircraft flight path; and
- comparing the calculated velocity differential with known aircraft operating characteristics for various wind shear velocity differentials to determine if the aircraft can safely pass through the shear zone.

2. The method of claim 1 further comprising the step of:

providing a warning indication if the comparison of wind shear velocity differentials indicates the aircraft can not safely pass through the shear zone.

3. The method of claim 2 further comprising the steps of:

comparing the measured in-line magnitudes to determine if a wind gradient will be encountered if the aircraft continues on the projected flight path;

calculating the magnitude of the wind gradient when it is determined to be present along the aircraft flight path; and displaying the type and magnitude of the wind gradient.

4. The method of claim 1 wherein the step of comparing the calculated wind velocity differential with known aircraft operating characteristics includes:

computing and storing altitude loss versus wind velocity differential information for the aircraft in a runway approach configuration;

comparing the calculated wind velocity differential with the stored information to determine possible altitude loss if the aircraft continues along the approach path through the shear zone;

measuring actual instantaneous aircraft altitude; and comparing the possible altitude loss with the actual instantaneous aircraft altitude and generating a warning signal when the actual altitude becomes equal to or less than the possible altitude loss.

5. The method of claim 4 wherein the step of measuring the in-line wind velocity and direction at the runway threshold includes:

transmitting information commensurate with the runway threshold wind conditions to the aircraft.

6. The method of claim 5 wherein the step of measuring the wind velocity and determining its direction at the aircraft comprises:

measuring the aircraft ground speed;

measuring the aircraft airspeed; and calculating the difference between the measured aircraft ground speed and airspeed to determine wind velocity and direction in-line with the aircraft flight path.

7. The method of claim 4 wherein the step of comparing the calculated wind velocity differential with known aircraft operating characteristics further comprises:

computing and storing airspeed increase versus wind velocity differential information for the aircraft;

comparing the calculated wind velocity differential with the stored information to determine possible airspeed increase if the aircraft continues along the approach path through the shear zone; and comparing possible increases in airspeed with a preselected maximum airspeed at the runway threshold and generating a warning signal if the possible increase to actual airspeed would result in the preselected maximum airspeed being exceeded.

8. The method of claim 7 further comprising the steps of:

comparing the measured in-line wind magnitudes to determine if a wind gradient will be encountered if the aircraft continues on the projected flight path;

calculating the magnitude of the wind gradient when it is determined to be present along the aircraft flight path; and displaying the type and magnitude of the wind gradient.

9. The method of claim 8 wherein the step of measuring the in-line wind velocity and direction at the runway threshold includes:

transmitting information commensurate with the runway threshold wind conditions to the aircraft.

10. The method of claim 9 wherein the step of measuring the wind velocity and determining its direction at the aircraft comprises:

measuring the aircraft ground speed;

measuring the aircraft airspeed; and calculating the difference between the measured aircraft ground speed and airspeed to determine wind velocity and direction in-line with the aircraft flight path.

11. The method of claim 4 wherein the step of comparing the calculated wind velocity differential with known aircraft operating characteristics further includes:

computing and storing altitude loss versus wind shear velocity differential for the aircraft in a takeoff configuration;

comparing the calculated shear velocity differential with the stored altitude loss information for takeoff configuration;

comparing actual altitude with the stored altitude loss information for takeoff configuration; and generating a warning signal when the determined shear velocity differential at the actual altitude is equal to or greater than the maximum safe shear velocity differential for that stored altitude.

12. The method of claim 11 wherein the step of generating a warning signal comprises:

utilizing successive airspeed inputs to determine if the airspeed is increasing or decreasing;

actuating the warning signal only for those values of computed shear velocity differential which occur simultaneously with a decreasing airspeed; and displaying all calculated shear velocity differentials which are coincident with decreasing airspeed.

* * * * *